United States Patent [19]

Tanaka

[11] 4,240,300

[45] Dec. 23, 1980

[54] OPERATION MECHANISM

[75] Inventor: Katsufusa Tanaka, Amagasaki, Japan

[73] Assignee: Mitsubishi Denki Kabushiki Kaisha, Tokyo, Japan

[21] Appl. No.: 932,083

[22] Filed: Aug. 8, 1978

[30] Foreign Application Priority Data

Aug. 8, 1977 [JP] Japan .................................. 52/95431

[51] Int. Cl.[3] .............................................. F16M 5/40

[52] U.S. Cl. ......................................................... 74/2

[58] Field of Search ............................................... 74/2

[56] References Cited

U.S. PATENT DOCUMENTS

| | | | |
|---|---|---|---|
| 3,174,022 | 3/1965 | Peek | 74/2 UX |
| 4,110,582 | 8/1978 | Barkan | 74/2 X |
| 4,113,063 | 9/1978 | Troy | 74/2 X |

*Primary Examiner*—James C. Mitchell
*Attorney, Agent, or Firm*—Oblon, Fisher, Spivak, McClelland & Maier

[57] ABSTRACT

An operation mechanism comprises an input shaft connected to a first resilient member for storing and releasing energy required for a reciprocal movement of a drivable member and an output shaft connected to a second resilient member for storing and releasing energy required for returning the drivable member. The ends of both shafts are coaxially faced and a clutch for interlocking the ends of the shafts with a free rotation for a half turn is formed and an output rod connected to the output shaft is reciprocally moved during an intermittent movement of the input shaft and the output shaft for about a half turn in a specific direction.

9 Claims, 12 Drawing Figures

OPERATION MECHANISM

BACKGROUND OF THE INVENTION

1. Field of the Invention

The present invention relates to an operation mechanism in which energy is mechanically stored in a resilient member and then the energy is released to instantaneously perform an opening or closing operation of a movable electrode of a circuit interrupter for switching a circuit.

2. Description of the Prior Art

The conventional operation mechanism is divided into an input side and an output side in a step of transmitting energy to an output rod, and it is assembled with different parts. At least two axes are required.

In a mechanism for transmitting energy between the two axes, a plurality of links and cams must be manufactured to high accuracy because of the instantaneous operation.

Accordingly, the weight of the total mechanism is increased and a large amount of energy is required for accelerating the links and the cams as well as the energy for the instantaneous operation.

The increase of the energy causes increases of the capacities of an energy storing member and a motor required for storing energy, and also causes a higher shock at the time of releasing the energy, whereby higher strength in rigidity of the total mechanism is required. This causes a disadvantageous further increase of the strength in rigidity and the increase of the weight of the parts.

SUMMARY OF THE INVENTION

It is an object of the present invention to overcome the disadvantages and to provide an operation mechanism having a simple and compact structure in which energy can be transmitted by a single axis and the operation can be performed by a small power source.

It is another object of the present invention to provide an operation mechanism which can minimize the capacity for storing energy as a power source.

It is the other object of the present invention to provide an operation mechanism wherein a spring for storing energy can also be used for a buffer effect.

It is further object of the present invention to provide an operation mechanism wherein an output is obtained by intermittently turning an input shaft and an output shaft to a specific direction and a smooth instantaneous operation having high efficiency can be attained.

DETAILED DESCRIPTION OF THE PREFERRED EMBODIMENTS

Figure 1:
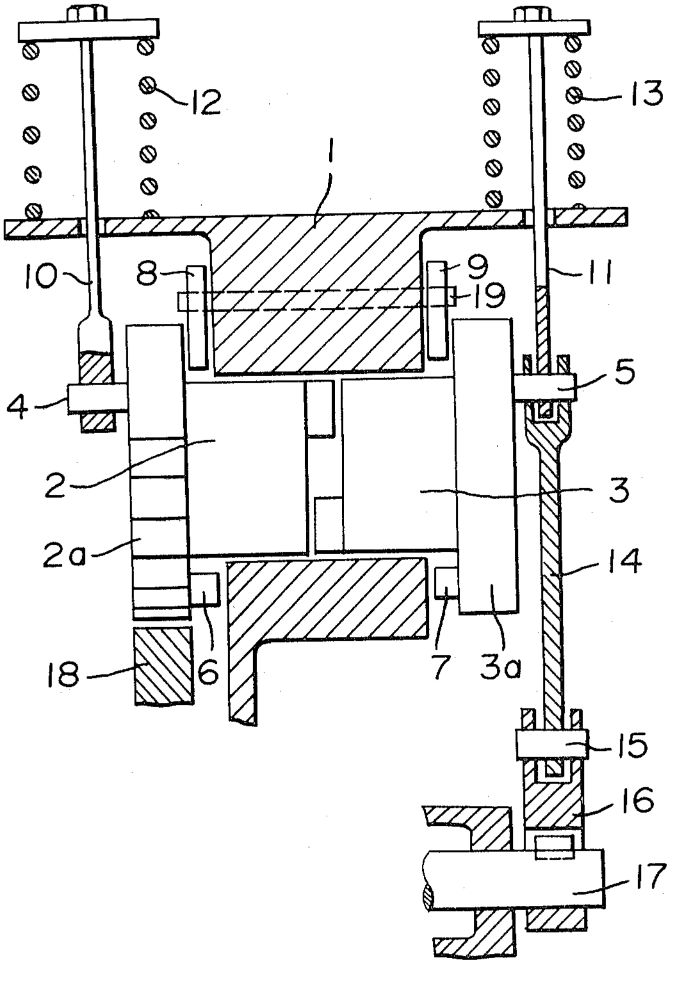
FIGS. 1 to 3 are front sectional views of one embodiment of an operation mechanism to the present invention in various conditions.

FIG. 1 is a schematic sectional view of one embodiment of an operation mechanism of the present invention.

Figure 9:
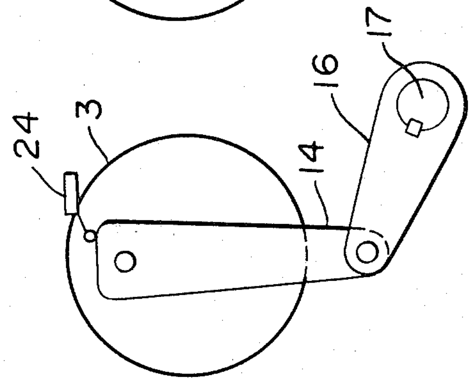

FIG. 1 shows a condition of releasing all springs (12), (13), wherein an operation lever (16) is in the condition shown in FIG. 9 as side view.

Figure 6:
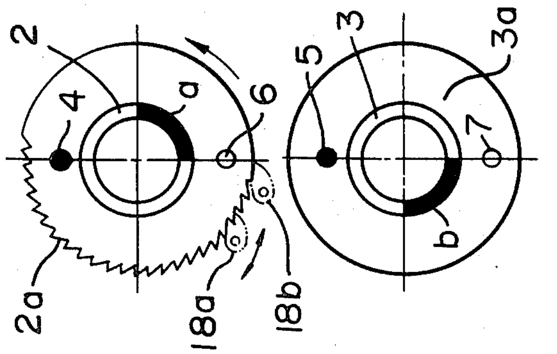
FIGS. 6 to 8 are respectively schematic views showing conditions interlocking a clutch.
Figure 7:
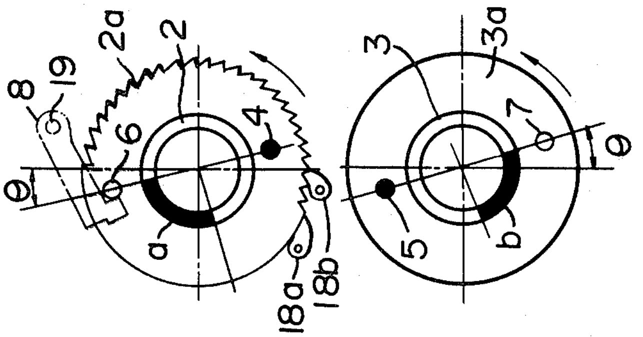
Figure 8:
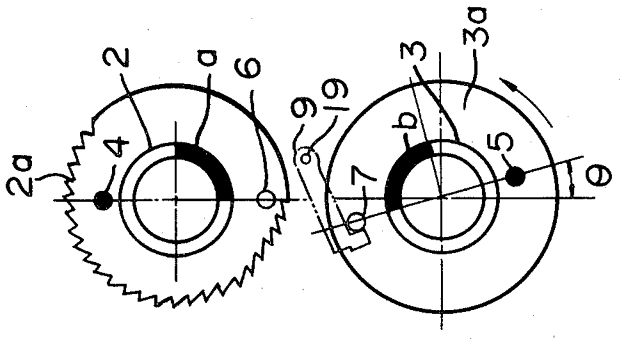

The reference (2) designates an input shaft whose right edge has a projecting part in a sector configuration for 90 degrees about the center of the shaft (part (a) of central ring in FIGS. 6 to 8). The part corresponding to the crank arm at the left edge of the shaft is formed by the input shaft (2) and a concentric ratchet (*2a*). A latch pin (6) for maintaining an actuated condition is fixed to the ratchet at the right (inner) side and a crank pin (4) for connecting a spring connecting rod (10) is fixed to the ratchet at the left (outer) side. The crank pin (4) and the latch pin (6) are disposed at positions separated by 180 degrees about the axis of the input shaft (2). The reference (3) designates an output shaft. The left edge of the shaft has a projecting part the same with that of the right edge of the input shaft (2) (part (b) of central ring in FIGS. 6 to 8). They are detachable from each other to form a clutch having free movement for a half turn. A crank pin (5) for connecting a spring connecting rod (11) and an output rod (14) and a latch pin (7) are fixed to the crank arm part (*3a*) at the right edge of the shaft.

The crank pin (5) and the latch pin (7) are disposed at positions having 180 degree separation about the axis of the output shaft (3). The reference (8) designates a latch for opening an electrode and (9) designates a latch for closing an electrode which has the same configuration with that of the latch (8). These latches are respectively turnable around a fulcrum consisting of a latch bearing (19).

Figure 5:
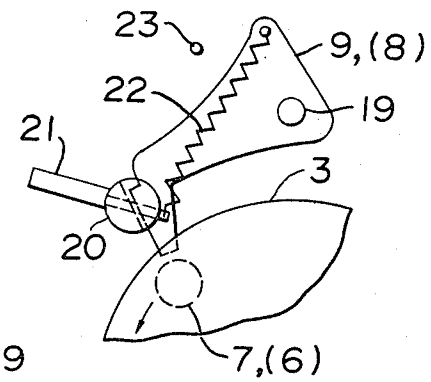
FIG. 5 is a partially enlarged side view of the embodiment in the condition after starting the electrode closing operation.
Figure 4:
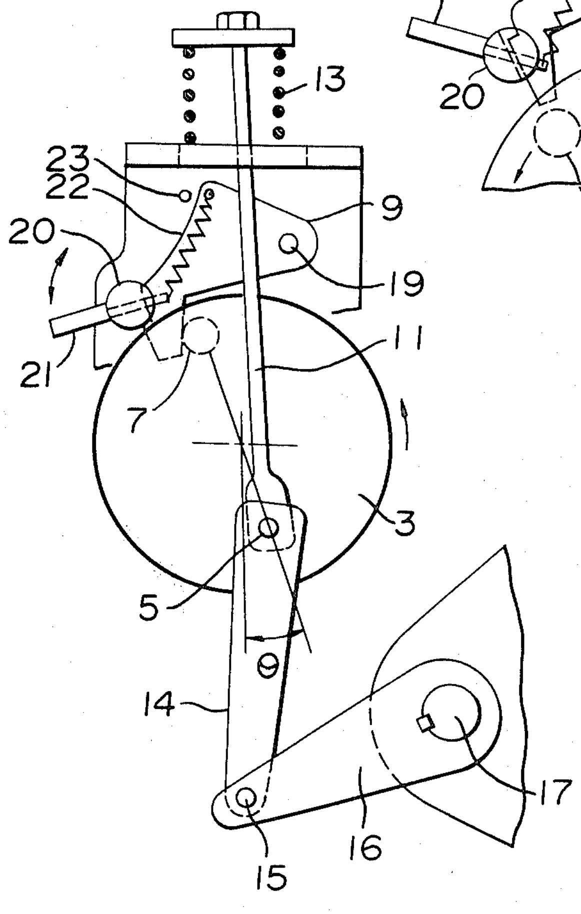
FIG. 4 is a partially enlarged side view of the embodiment in the condition before starting the electrode closing operation.

FIGS. 4 and 5 are schematic side views of the latch part as seen from the side of the output shaft (3). The reference (12) designates a spring at the input side, which can store energy required for opening and closing the electrode. That is, when the spring (12) is actuated and then, released, the energy required for opening the electrode is stored in the spring (13) at the output side and the electrode is simultaneously closed. The spring (13) is used for closing the electrode by pulling up the output rod (14). The output rod (14) is connected to the operation lever (16) by a pin (15) and an operation shaft (17) is reciprocally moved in a specific angle by the operation lever (16) and the edge of the shaft is connected to the movable electrode (not shown). In FIG. 1, a ratchet (18) comprises a pair of a stationary claw and a movable claw and interlocks with the ratchet (*2a*) of the input shaft to turn the input shaft (2) to the specific direction in store energy to the spring. In FIG. 6, the movable claw (*18a*) and the stationary claw (*18b*) are shown. The detail of the ratchet is not shown.

Figure 2:
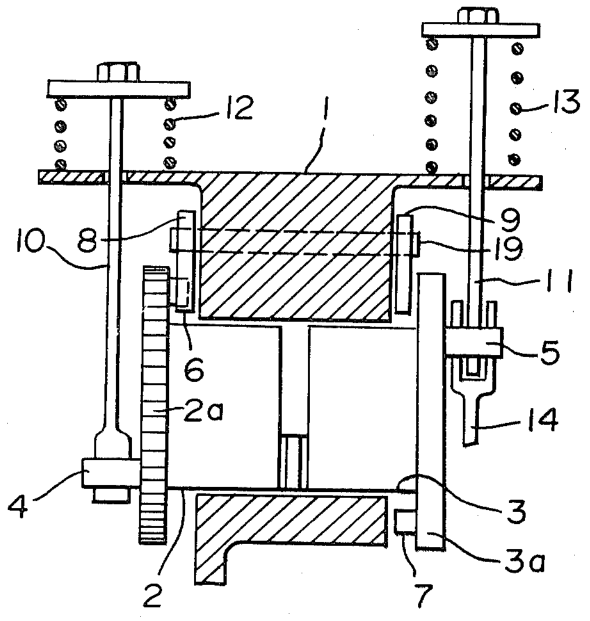

FIG. 2 is a front view of the operation mechanism in the condition of actuating the spring (12) at the input side.

Figure 3:
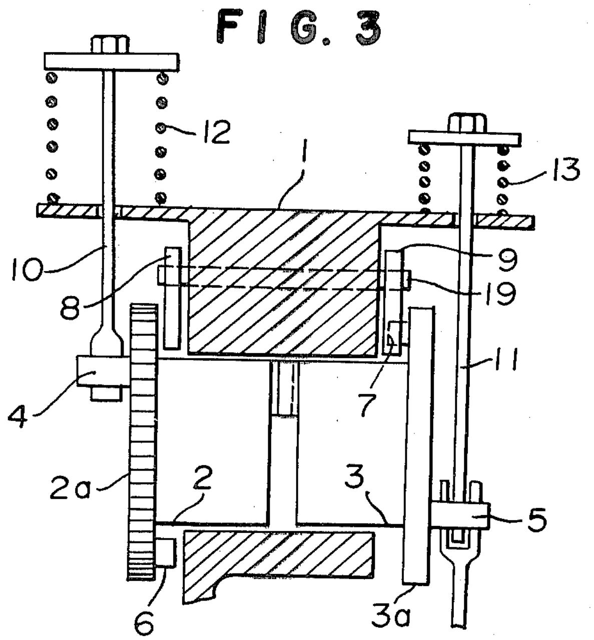

FIG. 3 is a front view of the operation mechanism in the condition of releasing the spring (12) and actuating the spring (13) at the output side.

Figure 12:
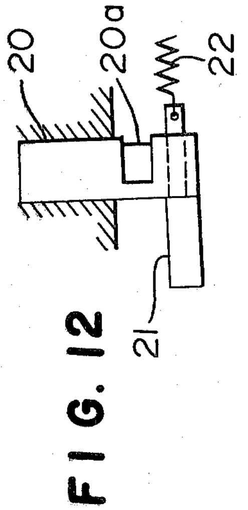
FIG. 12 is a partially enlarged view of a part of the embodiment of the present invention.

FIG. 4 is a schematic side view of the operation mechanism from the side of the output shaft to show the condition in FIG. 3. The reference (20) designates a trigger for operating the latch (9) and the part interlocking with the latch (9) has a sectional view of a semicircular configuration (20*a*) at the part of the shaft as shown in FIG. 12.

The reference (21) designates a releasing lever for operating the trigger (20) and (22) designates a tension spring for interlocking the trigger (20) with the latch (9); (23) designates a stopper pin for preventing excess pivoting of the latch (9) in the downward direction.

In the input side, the parts corresponding to the parts (20) to (23) are provided (not shown) to form a pair with the latch (8) in FIG. 1.

FIG. 5 shows the condition of detaching the latch pin (7) from the latch (9) by upwardly operating the releasing lever (21).

FIGS. 6 to 8 are respectively schematic side views for showing relations between the input shaft (2) and the output shaft (3) from the side of the output shaft.

The rings at the central part show clutches interlocking each other and the parts (a), (b) show the projecting parts. In these figures, circles show the latch pins (6), (7) and circles show positions of the crank pins (4), (5).

The upper views show the input shaft (2) and the lower views show the output shaft (3) and the shafts are turned in the arrow line direction.

Figure 11:
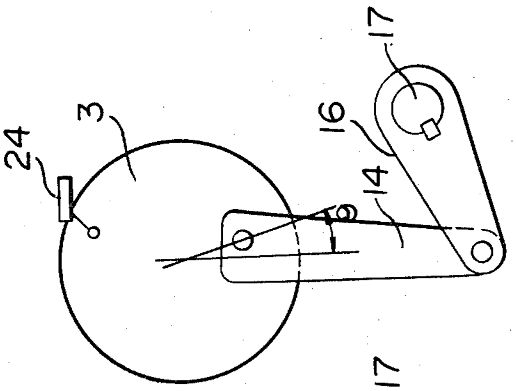
FIGS. 9 to 11 are respectively schematic views for the operation showing a position of an operation lever.
Figure 10:
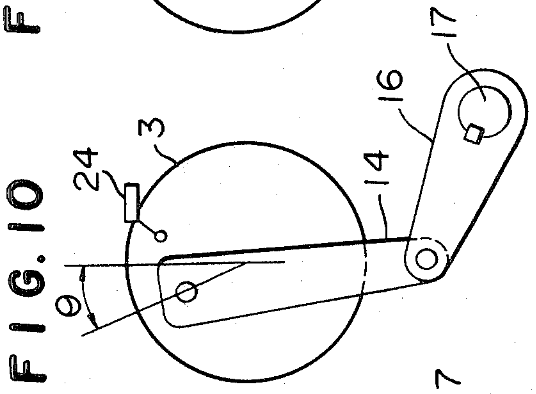

FIG. 6 shows the condition of releasing energy from the springs (12), (13) in the input side and the output side to open the electrode as in FIG. 1;

FIG. 7 shows the condition of storing energy into the spring (12) in the input side to open the electrode as in FIG. 2;

FIG. 8 shows the condition of storing energy into the spring (13) in the output side to close the electrode as in FIG. 3;

FIGS. 9 to 11 show positions of the output rod (14) and the operation lever (16);

FIG. 9 shows the condition of FIGS. 1 and 6;

FIG. 10 shows the condition of FIG. 2; and

FIG. 11 shows the condition of FIGS. 3 and 8.

In FIGS. 9 to 11, the reference (24) designates a limit switch for controlling a motor for turning the input shaft to store energy into the spring (12).

The operation will be illustrated in order.

When the condition of opening the electrode is given as shown in FIGS. 1, 6 and 9, the output rod (14) actuates the limit switch (24) fixed on the frame (1) and the motor (not shown) for storing energy into the spring is driven by the resulting signal and the ratchet (18) is moved to turn the input shaft (2) in the arrow line direction in FIG. 6.

The crank pin (4) held by the input shaft (2) moves downwardly from the upper dead point to pull down the spring connecting rod (10) whereby the spring (12) is compressed to store energy.

When the crank pin (4) descends to the lower dead point, the clutch surfaces of the input shaft (2) and the output shaft (3) are interlocked. When they are further turned by the ratchet (18), the input shaft (2) is freely turned and both of the input shaft (2) and the output shaft (3) are connected to turn for an angle $\theta$ as shown in FIG. 7. The latch pin (6) fixed on the input shaft (2) is contacted with the receiving surface of the latch and is stopped. In such case, the spring (13) in the output side is slightly compressed whereby the force for turning the output shaft (3) to the direction opposite to the arrow line of FIG. 7 is applied, however it is held at the position because it is interlocked with the clutch surface of the input shaft (2).

The force is applied to turn the input shaft (2) to the reverse direction through the clutch, however the condition of FIG. 7 is maintained because the force of the spring (12) of the input shaft (2) is set to be higher than the force of the spring (13) in the output side.

The condition between the latch pin (6) and the latch (8) at the output side is the same with the condition of FIG. 4 except the parts (14) to (17) are removed.

In this condition, as shown in FIG. 10, the limit switch (24) is turned from the ON state to the OFF state to output a command for stopping the motor. Even though the motor is rotated by inertia force, the movable claw (18*a*) reciprocally turned only the part having no tooth of the ratchet (2*a*).

In the operation for closing the electrode, when the releasing lever (21) in a pair with the latch (8) in FIG. 1 is to be upwardly operated as shown in FIG. 4, the trigger (20) is turned to detach the interlocking of the latch (8) with the semi-circular part of the trigger (20). The latch (8) is upwardly pulled by the force for turning the latch pin (6) whereby the rotation of the input shaft (2) becomes free. Such a condition is shown in FIG. 5. When the rotation of the input shaft (3) is free, both the input shaft (2) and the output shaft (3) are connected to turn in the arrow line direction in FIG. 7.

In such case, the energy released by the spring (12) in the input side is the sum of the energy required for closing the electrode and the energy required for opening the electrode. Accordingly, the crank pin (5) fixed on the output shaft (3) is moved downwardly by the turning of the output shaft (3) whereby the spring connecting rod (11) is downwardly moved to compress the spring (13) whereby the energy required for opening the electrode is stored into the spring (13) and at the same time, the output rod (14) is downwardly moved to push the operation lever (16) connected to the output rod (14) and the operation shaft (17) fixed on the operation lever (16) is turned to shift the electrode to the position for closing. The position of the crank pin (5) is passed through the lower dead point by the inertia force etc. When the crank pin (5) is passed through the lower dead point, the spring (13) is in the released condition, and the output shaft (3) is further turned to in the same direction until the latch pin (7) fixed on the output shaft (3) is contacted with the surface of the latch (9) to stop and hold the output shaft (3) at the position.

On the other hand, the input shaft (2) is stopped by the crank pin (4) reaching the upper dead point. The spring force is not zero at the time of releasing the spring (12) and the spring force for holding the crank pin (5) fixed on the output shaft (3) at the upper dead point still remains after releasing the spring (13).

The positions for closing the electrodes are shown in FIGS. 3, 4, 8 and 11.

When it is desired to open the electrode, the releasing lever (21) in the side of the output shaft (3) shown in FIG. 4 is upwardly operated to release the latch pin (7) whereby the energy stored in the spring (13) is released to turn the output shaft (3). The crank pin (5) fixed on the output shaft (3) is upwardly shifted and the output rod (14) connected to the crank pin (5) is pulled up to give the condition for opening the electrode. The output shaft (3) is turned and the crank pin (5) fixed on the output shaft is passed through the upper dead point.

When the force for turning the output shaft is further applied by the inertia force, the clutches for the input shaft (2) and the output shaft (3) are interlocked and the force for turning to the same direction is applied and the springs (12), (13) are compressed to prevent the turning of the shaft whereby the position of the crank pin (5) is held at the upper dead point to give the conditions shown in FIGS. 1, 6 and 9.

The limit switch (24) shown in FIG. 9 is actuated to turn the input shaft (2) and the energy is stored in the spring. The operation is repeated.

In said description, the compression spring is used as the means for storing energy. Thus, it is possible to use a rubber instead of the spring and it is also possible to use a tensile spring instead of the compression spring.

In the embodiment, the clutch parts for the input shaft (2) and the output shaft (3) have respectively the projecting parts at the edges of the shafts. Thus, it is possible to interlock an inner cylinder with an outer cylinder instead of the clutch having the projecting parts. The clutch having free rotation for a half turn can be provided by the interlocking of a pin with a groove.

In said description, the embodiment for opening and closing the electrode for a switch is illustrated. However, it is possible to use the operation mechanism of the invention to any means for requiring instantaneous reciprocal movement such as valves, shutters, presses and shears.

In the conventional mechanism, two or more axes are required for transmitting the movement and links and cams are also required.

On the contrary, as described, the mechanism of the present invention is to combine the clutch having free rotation for a half turn with a crank movement and to form the structure on one axis and to be a simple and compact operation mechanism. Moreover, the capacity for storing energy can be small and the spring for storing energy can be used as buffer spring. Accordingly, it is unnecessary to additionally provide a buffer device. Further more, effective and smooth instantaneous operation can be attained by providing the output during the intermittent turning to one direction.

What is claimed as new and desired to be secured by Letters Patent of the United States is:

1. An operation mechanism which comprises a first resilient member for storing and releasing energy required for a reciprocal movement of a drivable member; an input shaft having a first pin for rotatably holding an end of a first rod connected to said first resilient member at an eccentric position; a second resilient member for storing and releasing energy required for returning the drivable member; and an output shaft having a second pin for rotatably holding an end of a second rod connected to the second resilient member and an end of an output rod for operating the drivable member at an eccentric position; wherein one end of the input shaft and one end of the output shaft are facing and coaxial and a clutch for interlocking the ends of said facing shafts for one half turn with a free rotation of the other half turn is formed on said facing shafts and the output rod connected to the output shaft is reciprocally moved during intermittent movement of the input shaft and the output shaft for about a half-turn in one direction.

2. An operation mechanism according to claim 1 wherein a ratchet is coaxially fixed on the input shaft and the input shaft is turned by a claw interlocked with the ratchet so as to store energy into the first resilient member.

3. An operation mechanism according to claim 1 wherein said clutch is formed of interlocking projections having a sector configuration for 90 degrees said projections being formed at edges of the input shaft and the output shaft.

4. An operation mechanism according to claim 3 wherein said projections of the input shaft and the output shaft are positioned so as to be interlocked when said first pin reaches a dead point.

5. An operation mechanism according to claim 4 which further comprises a latch pin connected to the input shaft and a latch for interlocking with said latch pin at a predetermined angle of said input shaft from said dead point after connecting the input shaft to the output shaft.

6. An operation mechanism according to claim 5 which further comprises a latch pin connected to the output shaft and a latch for interlocking the latch pin at a predetermined angle of said output shaft to store energy into the second resilient member.

7. An operation mechanism according to claim 5 which comprises a trigger which is detachable from the latch and holds the latch to the position of connection to the latch pin by a spring wherein the latch is movably disposed at a position capable of connecting to the latch pin.

8. An operation mechanism according to claim 5 wherein the pin and the latch pin are disposed at positions separated by an angle of 180 degree about the center of the input shaft.

9. An operation mechanism according to claim 1 wherein the first resilient member and the second resilient member are respectively springs.

* * * * *